United States Patent [19]

Petit

[11] Patent Number: 5,566,163
[45] Date of Patent: Oct. 15, 1996

[54] POLICING METHOD GUARANTEEING FAIR THROUGHPUT AND DEVICE REALIZING SUCH A METHOD

[75] Inventor: Guido H. M. Petit, Antwerp, Belgium

[73] Assignee: Alcatel N.V., Rijswijk, Netherlands

[21] Appl. No.: 458,027

[22] Filed: Jun. 1, 1995

[30] Foreign Application Priority Data

Jun. 9, 1994 [EP] European Pat. Off. ............. 94201641

[51] Int. Cl.⁶ ...................................................... H04J 3/14
[52] U.S. Cl. ........................... 370/17; 370/60.1; 370/94.2
[58] Field of Search ................................. 370/13, 14, 17, 370/54, 60, 60.1, 61, 79, 84, 85.6, 94.1, 94.2; 340/825.06, 825.5, 825.51, 825.52

[56] References Cited

U.S. PATENT DOCUMENTS

| | | | |
|---|---|---|---|
| 5,253,247 | 10/1993 | Hirose et al. | 370/14 |
| 5,339,332 | 8/1994 | Kammerl | 370/94.1 |
| 5,361,253 | 11/1994 | Feijen et al. | 370/17 |
| 5,394,408 | 2/1995 | Nishihara et al. | 370/14 |
| 5,432,713 | 7/1995 | Takeo et al. | 370/79 |
| 5,442,624 | 8/1995 | Bonomi et al. | 370/17 |
| 5,448,567 | 9/1995 | Dighe et al. | 370/94.2 |

*Primary Examiner*—Alpus H. Hsu
*Attorney, Agent, or Firm*—Ware, Fressola, Van Der Sluys & Adolphson

[57] ABSTRACT

The policing device verifies at a predetermined location of a communication system whether a cell stream transmitted over that communication system satisfies a negotiated cell interarrival time and a negotiated cell delay variation and takes adequate actions. The verification is performed according to an algorithm including the steps of comparing for each cell of the cell stream and at the predetermined location the current arrival time of the cell with a predicted arrival time and discarding the cell if that predicted arrival time is larger than the sum of the present arrival time and an additional time interval. When simultaneously the cell is discarded and the additional time interval is smaller than the negotiated cell interarrival time, the predicted arrival time is adapted and the additional time interval is increased to a value having an upper limit equal to the negotiated cell interarrival time, whereas when the predicted arrival time is smaller than or equal to the current arrival time, the additional time interval is decreased to a value having a lower limit equal to the negotiated cell delay variation.

8 Claims, 1 Drawing Sheet

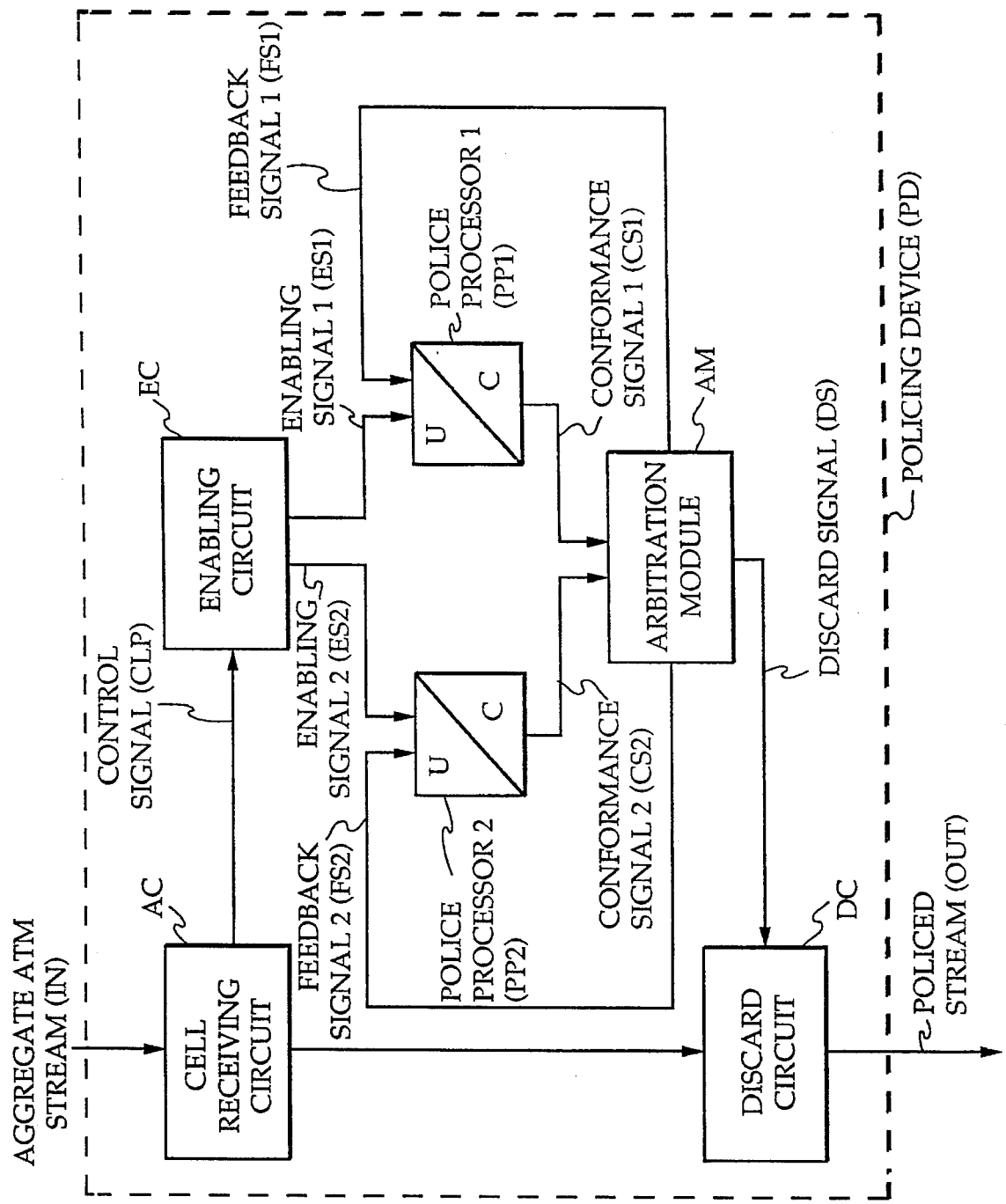

5,566,163

POLICING METHOD GUARANTEEING FAIR THROUGHPUT AND DEVICE REALIZING SUCH A METHOD

TECHNICAL FIELD

The present invention relates to a policing method for verifying at a predetermined location of a communication system whether a cell stream transmitted over said communication system satisfies a negotiated cell interarrival time and a negotiated cell delay variation, and for taking adequate actions according to the result of said verification, said method including the steps of:

comparing for each cell of said cell stream and at said predetermined location the current arrival time of said cell with a predicted arrival time;

discarding said cell if said predicted arrival time is larger than the sum of said present arrival time and an additional time interval.

BACKGROUND OF THE INVENTION

Such a policing method is already known in the art under the name of Virtual Scheduling Algorithm (VSA) or Continuous Leaky Bucket (CLB) algorithm and is for instance described in the ITU-T Recommendation I.371.

Analysis of the throughput behaviour of a VSA-based policing device for behaving and misbehaving Constant Bit Rate (CBR) connections shows that a small violation of the negotiated cell interarrival time may lead to an excessively high cell discard ratio. Moreover, a fair throughput can not always be guaranteed as, e.g. an above violation of 1% may lead to a cell loss of 50% of all cells, while a violation of 10% may give rise to a cell discard ratio of 30%. Such an analysis is for instance made in the article "Performance analysis of GCRA for CBR sources" by V. K. Samalam et al., ATM Forum contribution 94-0182, March 1994.

DISCLOSURE OF THE INVENTION

An object of the present invention is to provide a policing method of the above known type but which guarantees a fair cell throughput.

According to the invention, this object is achieved due to the fact that when simultaneously said cell is discarded and said additional time interval is smaller than said negotiated cell interarrival time, said predicted arrival time is adapted and said additional time interval is increased to a value having an upper limit equal to said negotiated cell interarrival time, whereas when said predicted arrival time is smaller than or equal to said current arrival time said additional time interval is decreased to a value having a lower limit equal to said negotiated cell delay variation.

By thus adapting the additional time interval it has been found that a small violation of the earlier mentioned type does not result in an excessive cell loss ratio. According to the analysis in the above mentioned article the additional time interval is in the above first case best made equal to the negotiated cell interarrival time. In the above second case, i.e. when the predicted arrival time is smaller than or equal to the current arrival time, the additional time interval is preferably made equal to the negotiated cell delay variation.

Additionally, when the additional time interval is made equal to the negotiated cell interarrival time, the predicted arrival time is adapted to make sure that two cells which arrive back-to-back are not allowed to pass the policing device.

An additional feature of the current invention is that said method additionally includes the step of adapting said predicted arrival time when said predicted arrival time is smaller than or equal to said sum and that the steps of adapting said predicted arrival time comprise in making said predicted arrival time equal to the sum of said negotiated cell interarrival time and either said current arrival time or said predicted arrival time depending on said predicted arrival time being smaller than or equal to said current arrival time or not respectively.

The present invention also relates to a policing device such as the one described in the co-pending U.S. patent application Ser. Nos. 08/382,654 and 08/382,655 but where the above described new algorithm is applied.

The above mentioned and other objects and features of the invention will become more apparent and the invention itself will be best understood by referring to the following description of an embodiment taken in conjunction with the accompanying drawing which shows a policing device realizing a method according to the present invention.

BRIEF DESCRIPTION OF THE DRAWINGS

The sole FIGURE shows a policing device with which the policing method of the present invention may be carried out.

BEST MODE FOR CARRYING OUT THE INVENTION

The policing device PD of the FIGURE is for instance used at the input of a switching network (not shown) with the purpose of verifying if the characteristics of a cell stream which have been negotiated with a user at call set-up are respected by this user and of performing corrections if necessary.

PD is more particularly used for the policing with respect to the cell interarrival time and the cell delay variation of an aggregate ATM stream of high priority first cells characterized by a Cell Loss Priority or CLP bit equal to 0 and of low priority second cells characterized by a CLP bit equal to 1. Such an aggregate stream IN is supplied to the policing device PD at a like named terminal thereof and the policing device PD generates therefrom a policed stream OUT appearing at its like named output terminal. The policed stream thus generated is such that both the aggregate stream and the substream therein constituted by high priority cells behave within the above mentioned characteristics negotiated at connection set-up.

The policing device PD more particularly includes a cell receiver circuit AC which for each cell received by it generates a control signal CLP identifying the cell priority i.e. whether it is a low or a high priority cell. It applies this control signal CLP which is identical to the CLP bit of the received cell to a control input of an enabling circuit EC and also forwards this cell to a discard circuit DC. This circuit DC discards the cell from the policed stream OUT or inserts it therein dependent on a discard signal DS generated by control circuitry EC, PP1, PP2 and AM which is described hereinbelow. The latter control circuitry EC, PP1, PP2 and AM thus actually enforces the negotiated characteristics for the stream IN, whereas the actual physical derivation of the policed stream OUT is left to the discard circuit DC on the basis of the Go/NoGo type discard signal DS generated by this control circuitry.

The control circuitry EC, PP1, PP2 and AM includes the mentioned enabling circuit EC which in function of the above control signal CLP activates a first police processor PP1 or a second police processor PP2 by means of a first or a second enabling signal ES1 and ES2 respectively. The latter signals are applied to enabling inputs of these processors PP1 and PP2 respectively.

These police processors PP1 and PP2 implement an instance of a same Modified Fair Throughput Virtual Scheduling Algorithm or MFTVSA which is described hereinbelow and can be considered as comprising an update part U and a conformance check part C, as schematically shown in the drawing. By activating one of these processors PP1/PP2 and hence by carrying out at a specific point in time the respective instances of the MFTVSA, a first/second conformance signal, CS1/CS2, is produced indicating whether a cell processed by the corresponding police processor PP1/PP2 satisfies (or conforms to) the characteristic to be enforced thereby.

These conformance signals CS1 and CS2 are supplied to an arbitration module AM which in response thereto produces the above discard signal DS as well as a first and a second feedback signal FS1 and FS2 and applies the latter signals to control inputs of PP1 and PP2 respectively. As will become clear lateron, these feedback signals FS1 and FS2 indicate to their corresponding processors whether or not they have to update a parameter used in the corresponding instance of the MFTVSA according to a value that is prepared together with the generation of the conformance signals.

Before describing an application of the present policing device PD, the Fair Throughput Virtual Sheduling Algorithm or FTVSA from which the above mentioned MFTVSA is derived is described in relative detail. This FTVSA is hereafter shown in pseudo-code form:

```
IF (PredictedAT<=Time)
   THEN
      BEGIN
         PredictedAT:=Time+Tc
         t':=t
         CellStatus:=CONFORMING
      END
   ELSE
      IF (PredictedAT>Time+t')
         THEN
            BEGIN
               IF (t'<Tc)
                  THEN
                     BEGIN
                        t':=Tc
                        PredictedAT:=PredictedAT+Tc
                     END
               CellStatus:=NON-CONFORMING
            END
         ELSE
            BEGIN
               PredictedAT:=PredictedAT+Tc
               CellStatus:=CONFORMING
            END
```

Where, PredictedAT is a predicted arrival time;

Time is the current arrival time of a cell;

t is the negotiated cell delay variation;

Tc is the negotiated cell interarrival time;

CellStatus is a conformance value indicating whether or not the handled cell is conforming according to the applied instance of the FTVSA.

The above described algorithm guarantees fair throughput. Indeed, as mentioned earlier, making t' equal to Tc guarantees that in case of a small violation of the negotiated Tc values the resulting cell loss ratio is not excessive, whereas adapting the predicted arrival time even in case of non-conformance when t' is made equal to Tc guarantees that two cells arriving back-to-back are not both inserted in the policed stream.

The MFTVSA is derived from the FTVSA and comprises the following code:

```
IF (PredictedAT<=Time)
   THEN
      BEGIN
         Temp_PAT:=Time+Tc
         Temp_t':=t
         CellStatus:=CONFORMING
      END
   ELSE
      IF (PredictedAT>Time+t')
         THEN
            BEGIN
               IF (t'<Tc)
                  THEN
                     BEGIN
                        Temp_t':=Tc
                        Temp_PAT:=PredictedAT+Tc
                     END
               CellStatus:=NON-CONFORMING
            END
         ELSE
            BEGIN
               Temp_PAT:=PredictedAT+Tc
               CellStatus:=CONFORMING
            END
```

Wherein,

Temp_PAT is an intermediate variable containing a preliminary updated value of PredictedAT, and Temp_t' is an intermediate variable containing a preliminary updated value of t'.

The above MFTVSA is similar to the FTVSA except that the predicted arrival time and t' are not update immediately but that only an update is prepared for it in the intermediate variables Temp_PAT and Temp_t'. Whether or not this update is effectively applied then depends upon a 2-bit feedback value FS. The first and second bit indicate whether PredictedAT and t' have to be updated or not respectively, e.g. a 1 value indicates that an update has to be performed.

MFTVSA is implemented by each of the police processors PP1, PP2 in order to be able to use identical police processors in the policing device PD.

It is to be noted that the above MFTVSA may clearly be considered as being split up in a conformance check part C deriving the conformance signal CS which corresponds to the value of CellStatus, and in an update part U preparing the updated values Temp_PAT and Temp_t', and carrying out this update or not. It is further to be noted that the processors PP1 and PP2 in carrying out an instance of the MFTVSA generate the resulting conformance values CS as conformance signals CS1 and CS2 respectively and that the feedback signals FS1 and FS2 issued by the arbitration module AM are used by the above instances of the MFTVSA as feedback values.

With the above description of the policing device PD in mind the application of a distinct policing method using MFTVSA and based on I.371 is now discussed in detail by defining the operation of the enabling circuit EC and the arbitration module AM for these methods.

For this policing methods the enabling circuit EC activates both processors PP1 and PP2 for the high priority first cells and the second processor PP2 only for low priority second cells in accordance with the following table wherein the value of the control signal CLP as already mentioned above denotes the priority of the actually handled cell as already mentioned earlier:

| CLP | ES1 | ES2 |
| --- | --- | --- |
| 0 | 1 | 1 |
| 1 | 0 | 1 |

From this table it is clear that high priority cells are handled both by PP1 and PP2, while low priority cells are handled by PP2 solely. It may be verified that this is in line with the general meaning of the present version of the ITU-TS recommendation I.371 which prescribes that the ATM stream IN including both high and low priority cells should be policed as a whole while the substream formed by the high priority cells should also be policed separately.

The arbitration module AM is realized in such a way that it performs the logical operations summarized in the following table. In this table CLP is included for clarity's sake; CS1 and CS2 are 2-bit variables indicating which condition of the MFTVSA is fulfilled, i.e. 11 indicates that PredictedAT<=Time; 01 that PredictedAT>Time+t' and t'<Tc; 00 means that PredictedAT>Time+t' and t'>=Tc, and 10 implies that Time<PredictedAT<=Time+t'; a value 1 for the discard signal DS indicates that the cell may be passed by DC; the feedback signals FS1 and FS2 are also 2-bit parameters indicating whether a prepared update has to be carried out (bit=1) or not (bit=0), where the first bit relates to the update of PredictedAT and the second one to the update of t'; dis. indicates that the police processor corresponding to one of the signals CS1, CS2, FS1 and FS2 is disabled by EC.

| CLP | CS1 | CS2 | DS | FS1 | FS2 |
| --- | --- | --- | --- | --- | --- |
| 0 | 01 | 01 | 0 | 11 | 11 |
| 0 | 00 | 01 | 0 | 00 | 00 |
| 0 | 01 | 00 | 0 | 11 | 00 |
| 0 | 00 | 00 | 0 | 00 | 00 |
| 0 | 01 | 11 | 0 | 11 | 00 |
| 0 | 00 | 11 | 0 | 00 | 00 |
| 0 | 01 | 10 | 0 | 11 | 00 |
| 0 | 00 | 10 | 0 | 00 | 00 |
| 0 | 11 | 01 | 0 | 00 | 11 |
| 0 | 10 | 01 | 0 | 00 | 11 |
| 0 | 11 | 00 | 0 | 00 | 00 |
| 0 | 10 | 00 | 0 | 00 | 00 |
| 0 | 10 | 11 | 1 | 10 | 11 |
| 0 | 11 | 11 | 1 | 11 | 11 |
| 0 | 10 | 10 | 1 | 10 | 10 |
| 0 | 11 | 10 | 1 | 11 | 10 |
| 1 | dis | 01 | 0 | dis | 11 |
| 1 | dis | 00 | 0 | dis | 00 |
| 1 | dis | 11 | 1 | dis | 11 |
| 1 | dis | 10 | 1 | dis | 10 |

From the above table it may be verified that the policing method implemented with respect to the aggregate cell stream is the one described in the above referenced article, i.e. wherein low priority cells are only inserted in the policed stream OUT when they conform to both police algorithm instances, whereas high priority cells are inserted in OUT when they conform to the police algorithm instance realized in PP2, and that the algorithm used is the FTVSA.

While the principles of the invention have been described above in connection with specific apparatus, it is to be clearly understood that this description is made only by way of example and not as a limitation on the scope of the invention.

I claim:

1. Policing method for verifying at a predetermined location of a communication system whether a cell stream transmitted over said communication system satisfies a negotiated cell interarrival time (Tc) and a negotiated cell delay variation (t), and for taking actions according to the result of said verification, said method comprising the steps of:

comparing for each cell of said cell stream and at said predetermined location a current arrival time (Time) of said cell with a predicted arrival time (PredictedAT);

discarding said cell if said predicted arrival time (PredictedAT) is larger than a sum of said current arrival time (Time) and an additional time interval (t'), characterized in that when simultaneously said cell is discarded and said additional time interval (t') is smaller than said negotiated cell interarrival time (Tc), said predicted arrival time (PredictedAT) is adapted and said additional time interval (t') is increased to a value having an upper limit equal to said negotiated cell interarrival time (Tc), and further characterized in that when said step of comparing compares a predicted arrival time (PredictedAT) that is smaller than or equal to said current arrival time (Time), said additional time interval (t') is decreased to a value having a lower limit equal to said negotiated cell delay variation (t).

2. Policing method according to claim 1, characterized in that said method additionally includes the step of adapting said predicted arrival time (PredictedAT) when said predicted arrival time is smaller than or equal to said sum.

3. Policing method according to claim 2, characterized in that said predicted arrival time (PredictedAT) is adapted by making said predicted arrival time equal to the sum of said negotiated cell interarrival time (Tc) and either said current arrival time (Time) or said predicted arrival time (PredictedAT) depending on said predicted arrival time being smaller than or equal to said current arrival time (Time) or not respectively.

4. Policing method according to claim 1, characterized in that said additional time interval (t') is increase by making said additional time interval equal to said negotiated cell interarrival time (Tc).

5. Policing method according to claim 1, characterized in that said additional time interval (t') is decreased by making said additional time interval equal to said negotiated cell delay variation (t).

6. Policing method according to claim 1, characterized in that said predetermined location is an entry point of said communication system.

7. Policing device (PD) including processing means (PP1, PP2) able to apply respective ones of a plurality of police algorithm instances to respective ones of a plurality of cell streams and each of said instances having a conformance check part (C) able to derive a conformance signal (CS1, CS2) indicating whether or not a cell of said cell stream handled by said conformance check part (C) is satisfactory or not and an update part (U) able to update a value of a parameter used by said instance, said processing means (PP1, PP2) being able to produce for each said cell a plurality of said conformance signals (CS1, CS2) in parallel and to supply them to an arbitration module (AM) which is also included in said device (PD) and which derives from said conformance signals a discard signal (DS) indicating whether or not said cell is to be discarded as well as a plurality of feedback signals (FS1, FS2) indicating whether or not the value of said parameter needs to be updated in respective ones of said instances, characterized in that at least one of said first and second conformance check parts compares for each cell of said cell stream a current arrival time (Time) of said cell with a predicted arrival time (PredictedAT) to indicate by way of said first and second conformance signals, respectively, to discard said cell when said predicted arrival time is larger than a sum of said current arrival time and an additional time interval (t'), and wherein at least one of said first and second update parts respectively adapts said predicted arrival time and increases said additional time interval to a value having an upper limit equal to a negotiated cell arrival time (Tc) when simultaneously said cell is discarded and said additional time interval is smaller than said negotiated cell arrival time, whereas, when said predicted arrival time is smaller than or equal to said current arrival time, said additional time interval is decreased to a value having a lower limit equal to a negotiated cell delay variation (t).

8. Policing device, comprising:
   a cell receiver circuit, responsive to an aggregate input cell stream having cells of different priorities, for providing said aggregate input cell stream and for providing a control signal;
   a discard circuit, responsive to said aggregate input cell stream from said cell receiver circuit and to a discard signal, for providing a policed output cell stream with selected cells discarded; and
   control circuitry, responsive to said control signal, for providing said discard signal, wherein said control circuitry comprises:
      an enabling circuit, responsive to said control signal, for providing a first enabling signal and a second enabling signal;
      a first police processor, responsive to said first enabling signal and to a first feedback signal, for providing a first conformance signal;
      a second police processor, responsive to said second enabling signal and to a second feedback signal, for providing a second conformance signal; and
      an arbitration module, responsive to said first and second conformance signal, for providing said first and second feedback signals and said discard signals; wherein
   said first and second police processors are for executing instances of a policing algorithm, and include first and second conformance check parts for respectively providing said first and second conformance signals indicating a satisfactory or unsatisfactory cell of said input cell stream and include first and second update parts respectively responsive to said first and second feedback signals for updating a parameter used in said instances, and wherein at least one of said first and second conformance check parts compares for each cell of said cell stream a current arrival time (Time) of said cell with a predicted arrival time (PredictedAT) to indicate by way of said first and second conformance signals, respectively, to discard said cell when said predicted arrival time is larger than a sum of said current arrival time and an additional time interval (t'), and wherein at least one of said first and second update parts respectively adapts said predicted arrival time and increases said additional time interval to a value having an upper limit equal to a negotiated cell arrival time (Tc) when simultaneously said cell is discarded and said additional time interval is smaller than said negotiated cell interarrival time, whereas, when said predicted arrival time is smaller than or equal to said current arrival time, said additional time interval is decreased to a value having a lower limit equal to a negotiated cell delay variation (t).

* * * * *

UNITED STATES PATENT AND TRADEMARK OFFICE
CERTIFICATE OF CORRECTION

PATENT NO.   :   5,566,163
DATED        :   October 15, 1996
INVENTOR(S)  :   G. Petit It is certified that error appears in the above-indentified patent and that said Letters Patent is hereby corrected as shown below:

At column 6, line 35 (claim 4, line 2), please cancel "increase" and substitute --increased-- therefor.

Signed and Sealed this

Twenty-eighth Day of January, 1997

Attest:

BRUCE LEHMAN

Attesting Officer    Commissioner of Patents and Trademarks